Dec. 15, 1931.  J. L. MUNSON  1,836,488
POULTRY FEED HOPPER
Filed Feb. 8, 1930
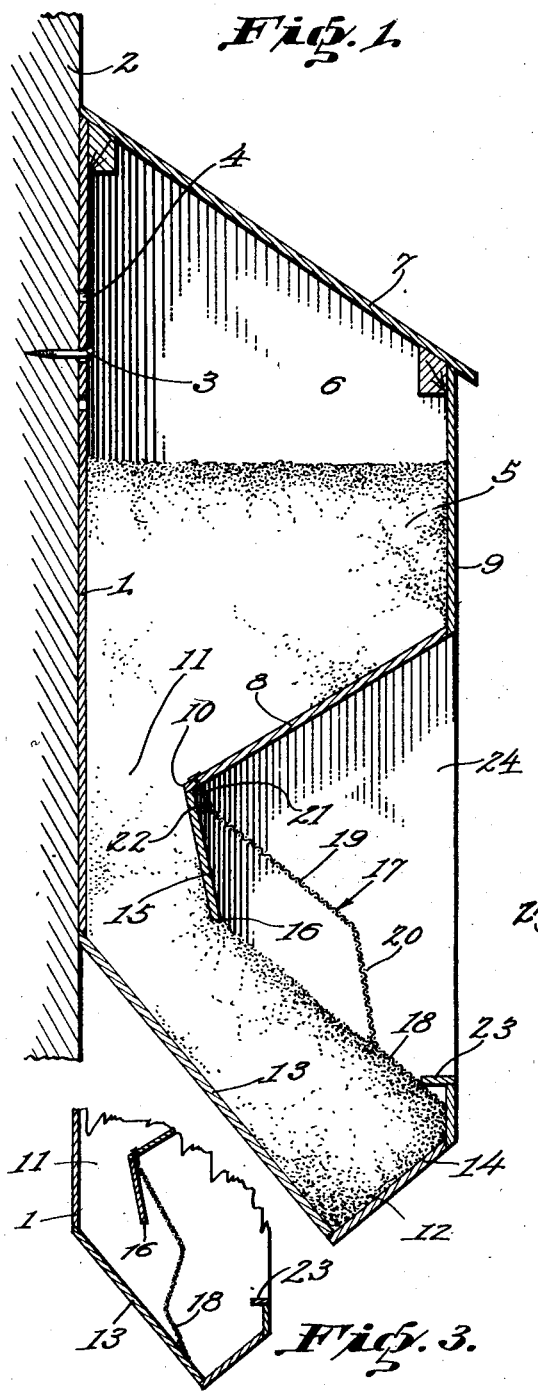
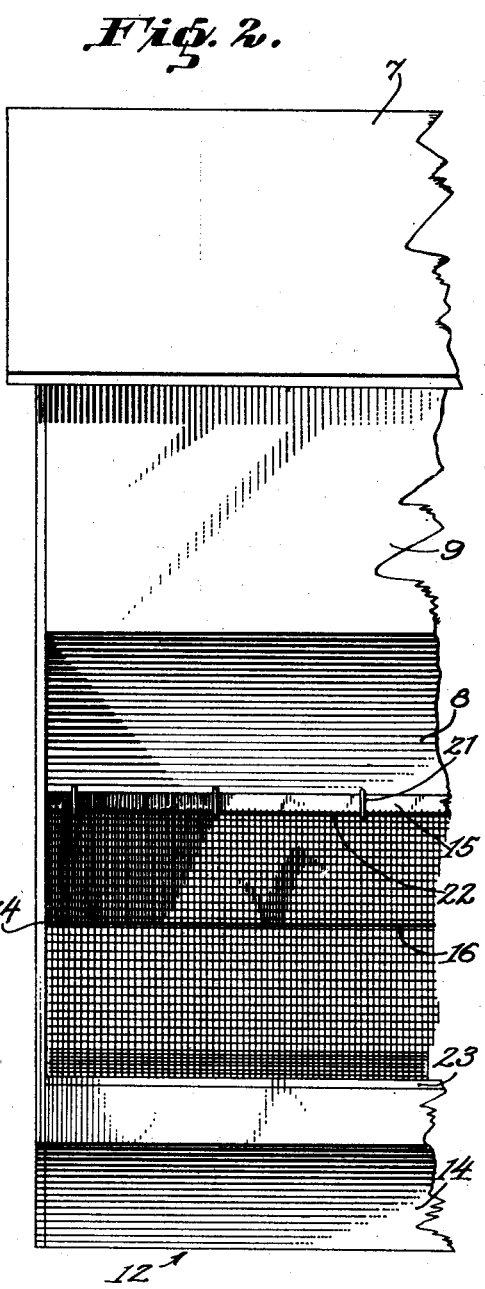
INVENTOR
John L. Munson
BY
ATTORNEYS Patented Dec. 15, 1931

1,836,488

UNITED STATES PATENT OFFICE

JOHN L. MUNSON, OF ARCADIA, CALIFORNIA

POULTRY FEED HOPPER

Application filed February 8, 1930. Serial No. 426,844.

This invention relates to a hopper for feeding poultry or the like. As usually constructed hoppers for this purpose embody an elevated hopper chamber in which the feed is placed and from which the feed gravitates downwardly as it is picked away at the lower portion of the hopper, at which point a feed trough is located. These hoppers are usually constructed in such a way that pockets are formed in which the feed may accumulate and it is generally necessary for the poultryman to loosen up the feed from time to time with a stick or similar implement to insure that portions of the feed will not stop in "dead" pockets in the feed line from the hopper chamber down to the feed trough. If mash is being fed in such a hopper, it may happen that if the hopper is not attended to as suggested above, a portion of the mash becomes fixed in the hopper and may become sour. If this sour mash at a later time passes down into the feed trough it may cause sickness in the poultry being fed.

Another objection to hoppers of this kind as usually constructed is that at the feed trough where the feed is exposed to the poultry, the hopper is constructed in such a way that the poultry may pick the feed at an elevated point where it is exposed. In this way some of the feed in the trough may be left for some time uneaten and it may become sour.

The general object of this invention is to provide a poultry feed hopper that will overcome these objections and having a construction on its interior which will insure that all the feed placed in the hopper chamber will feed down into the feed trough; also to provide a hopper of this kind having such a construction as will prevent the feed becoming clogged at any point in the hopper.

A further object of the invention is to construct the hopper in such a way that in picking the feed the poultry are obliged to pick it substantially at the lowest point of the feed line, thereby preventing any possibility of feed being left uneaten in the feed trough, to become sour.

Further objects of the invention will appear hereinafter.

The invention consists in the novel parts and combinations of parts to be described hereinafter, all of which contribute to produce an efficient poultry feed hopper.

A preferred embodiment of the invention is described in the following specification, while the broad scope of the invention is pointed out in the appended claims.

In the drawings:

Figure 1 is a vertical section through a hopper embodying my invention and indicating the feed within the hopper.

Figure 2 is a front elevation of one end of the hopper.

Figure 3 is a vertical section upon a reduced scale at the lower end of the hopper and indicating the relation of the screen to the hopper when the hopper is empty.

In practicing the invention I construct the hopper in such a way that there is no possibility for the feed to become choked in the hopper as it passes down from the elevated hopper chamber to the feed trough. In order to accomplish this I prefer to construct the hopper with a substantially vertical back wall 1 which can be set up against the face of the wall 2 of the poultry house. If desired, the wall 2 can be provided with short outwardly projecting rudimentary hooks 3 which may be received in any one of a plurality of openings 4 in the back wall 1 of the hopper. This enables the hopper to be supported at different heights from the floor.

The feed 5 may be placed in the hopper chamber 6 by lifting the removable cover 7. The feed chamber 6 has a bottom wall 8 that extends rearwardly from the front wall 9 of the hopper and inclines donwwardly toward the back wall 1. This inclined bottom wall 8 has sufficient inclination to insure that the feed will gravitate down it. Its lower edge 10 terminates short of the rear wall 1 so that a throat 11 is formed through which the feed passes downwardly along the feed line toward the feed trough 12 that is formed at the bottom of the hopper. This feed trough has an inclined back wall 13 that extends forward from the lower edge of the rear wall 1 and also has an outer bottom wall 14 that may make an angle of 90 degrees with the wall 13.

The throat 11 has its narrowest point uppermost, that is to say, it is of increasing width toward its lower end, the forward wall of the throat being formed by means of a relatively short inclined guide board or plate 15 which inclines downwardly and outwardly toward its lower edge 16 at which point the feed may pass into view of the poultry. This guide wall offers a desirable resistance to the downward movement of the feed.

I provide means for preventing the poultry from picking the feed near this point 16 because in that event the feed below this point might not be consumed immediately and might become sour. In order to accomplish this I provide a guard 17 preferably in the form of a wire mesh screen the lower portion of which constitutes an inwardly offset portion or foot extension 18 that is offset inwardly with respect to the body portion 19 of the screen, the body portion 19 being connected with the foot extension by an inclined extension 20. This screen is preferably movably mounted, for which purpose I prefer to support it by a plurality of hooks 21 at its upper edge at which point a pivot rod 22 may be provided carried at the upper edge of the screen and rotatably supported in the hooks. When the hopper is full of feed, the screen or guard 17 will occupy substantially the position shown in Figure 1, the outer face of the screen lying adjacent to the inner edge of a horizontal sill 23 that extends throughout the length of the hopper between the end boards or end walls 24 of the hopper.

When the hopper is empty of feed, the screen will fall down into the feed trough 12 (see Figure 3).

With a hopper constructed as described it will be evident that there is no point in the line of movement of the feed from the hopper chamber 6 in which the feed can lodge. The feed will gravitate down the inclined bottom wall 8 and if it passes the inlet into the throat 11 it cannot choke below that point because the throat 11 enlarges in a downward direction. Furthermore, the poultry in picking the feed must pick it in the vicinity of the sill 23 which insures that feed cannot remain uneaten at a low point in the feed line.

It is understood that the embodiment of the invention described herein is only one of the many embodiments this invention may take, and I do not wish to be limited in the practice of the invention, nor in the claims, to the particular embodiment set forth.

What I claim is:

1. A poultry feed hopper having a hopper chamber with an outlet opening below the same and having a substantially vertical back wall with an inclined guide wall below the outlet and extending outwardly and forwardly from the said back wall, said hopper having an opening on its forward side opposite the said inclined guide wall, and a screen movably mounted at the forward side of the hopper, the lower portion of said screen having an inwardly offset portion through which the poultry may pick the feed, the upper portion of the screen operating as a guard to prevent the poultry from picking the feed above the inwardly offset portion of the screen.

2. A poultry feed hopper having a hopper chamber with an outlet opening below the same and having a substantially vertical back wall with an inclined guide wall below the outlet and extending outwardly and forwardly from the said back wall, said hopper having an opening on its forward side opposite the said inclined guide wall, and a screen supported on the hopper so as to swing inwardly at its lower end and having an inwardly offset foot extension through which the poultry may pick the feed, the upper portion of the screen operating as a guard to prevent the poultry picking the feed above the foot extension.

3. A poultry feed hopper having a feed outlet below at which the feed within the hopper is exposed, and a screen supported at an upper point to swing inwardly at the feed outlet, and having an offset lower extension to rest upon the feed and through which the poultry may pick the feed, the upper portion of the screen operating as a guard to prevent the poultry from picking the feed above the offset lower extension.

4. A poultry feed hopper having a substantially vertical back wall and having a hopper chamber forward of the back wall with an inclined bottom wall inclining downwardly toward the said back wall and terminating short of the back wall so as to form a throat leading down from the hopper, said hopper having a forwardly extending inclined guide wall receiving the feed coming down through said throat to present the same to the poultry, and a screen supported at its upper edge on the hopper, said screen having a foot extension to rest upon the feed and through which the poultry may pick the feed.

5. A poultry feed hopper having a hopper chamber with an outlet opening below the same and having a substantially vertical back wall with a downwardly and outwardly inclined rear guide wall below the outlet, said hopper having a downwardly and outwardly inclined forward guide wall cooperating with the vertical back wall to form a guide throat enlarging in a downward direction, said hopper having an opening on its forward side opposite the said rear inclined guide wall, and a screen covering the said opening through which the poultry may pick the feed.

Signed at Arcadia, Calif., this 31st day of Jan., 1930.

JOHN L. MUNSON.